United States Patent
Clark et al.

(10) Patent No.: US 10,235,054 B1
(45) Date of Patent: Mar. 19, 2019

(54) SYSTEM AND METHOD UTILIZING A CACHE FREE LIST AND FIRST AND SECOND PAGE CACHES MANAGED AS A SINGLE CACHE IN AN EXCLUSIVE MANNER

(71) Applicant: EMC Corporation, Hopkinton, MA (US)

(72) Inventors: Roy E. Clark, Hopkinton, MA (US); Adrian Michaud, Carlisle, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 14/564,420

(22) Filed: Dec. 9, 2014

(51) Int. Cl.
- *G06F 3/06* (2006.01)
- *G06F 12/08* (2016.01)
- *G06F 12/0897* (2016.01)

(52) U.S. Cl.
CPC .......... *G06F 3/0611* (2013.01); *G06F 3/0647* (2013.01); *G06F 3/0685* (2013.01); *G06F 12/0897* (2013.01); *G06F 2212/1024* (2013.01); *G06F 2212/222* (2013.01); *G06F 2212/283* (2013.01)

(58) Field of Classification Search
CPC ............. G06F 12/0866; G06F 12/0693; G06F 12/0697; G06F 2212/225; G06F 2212/283; G06F 3/0685; G06F 3/0647; G06F 3/0611; G06F 3/061; G06F 12/0897; G06F 2212/222; G06F 2212/1024

See application file for complete search history.

(56) References Cited

U.S. PATENT DOCUMENTS

| | | | |
|---|---|---|---|
| 4,429,363 A | 1/1984 | Duke et al. | |
| 5,276,867 A | 1/1994 | Kenley et al. | |
| 5,386,547 A * | 1/1995 | Jouppi | G06F 12/0897 711/122 |
| 5,440,686 A | 8/1995 | Dahman et al. | |
| 5,564,035 A * | 10/1996 | Lai | G06F 12/0897 711/122 |
| 5,664,153 A | 9/1997 | Farrell | |
| 5,809,560 A | 9/1998 | Schneider | |

(Continued)

OTHER PUBLICATIONS

Office Action dated Dec. 11, 2015 for U.S. Appl. No. 14/319,440; 34 pages.

(Continued)

*Primary Examiner* — Glenn Gossage
(74) *Attorney, Agent, or Firm* — Daly, Crowley Mofford & Durkee, LLP

(57) ABSTRACT

A method and systems for caching utilize first and second caches, which may include a dynamic random-access memory (DRAM) cache and a next generation non-volatile memory (NGNVM) cache such as NAND flash memory. The methods and systems may be used for memory caching and/or page caching. The second caches are managed in an exclusive fashion, resulting in an aggregate cache having a storage capacity generally equal to the sum of individual cache storage capacities. Cache free lists may be associated with the first and second page caches and pages within a cache free list may be mapped back to an associated cache without accessing a backing store. Data can be migrated between the first cache and the second caches based upon access heuristics and application hints.

11 Claims, 6 Drawing Sheets

(56) References Cited

U.S. PATENT DOCUMENTS

| | | | |
|---|---|---|---|
| 6,205,528 B1 | 3/2001 | Kingsbury et al. | |
| 6,487,562 B1 | 11/2002 | Mason, Jr. et al. | |
| 6,618,793 B2* | 9/2003 | Rozario | G06F 12/023 |
| | | | 711/100 |
| 6,629,200 B1* | 9/2003 | Kanamaru | G06F 12/0866 |
| | | | 711/100 |
| 6,633,954 B1 | 10/2003 | Don et al. | |
| 6,715,037 B2 | 3/2004 | Malcolm | |
| 6,728,837 B2 | 4/2004 | Wilkes et al. | |
| 6,732,242 B2 | 5/2004 | Hill et al. | |
| 6,748,494 B1 | 6/2004 | Yashiro | |
| 6,795,894 B1 | 9/2004 | Neufeld et al. | |
| 6,829,698 B2 | 12/2004 | Arimilli et al. | |
| 6,829,762 B2 | 12/2004 | Arimilli et al. | |
| 6,842,847 B2 | 1/2005 | Arimilli et al. | |
| 6,851,024 B1* | 2/2005 | Wilkes | G06F 12/0866 |
| | | | 711/122 |
| 6,920,514 B2 | 7/2005 | Arimilli et al. | |
| 6,925,551 B2 | 8/2005 | Arimilli et al. | |
| 7,017,031 B2 | 3/2006 | Arimilli et al. | |
| 7,213,005 B2 | 5/2007 | Mourad et al. | |
| 7,213,248 B2 | 5/2007 | Arimilli et al. | |
| 7,644,239 B2 | 1/2010 | Ergan et al. | |
| 7,856,530 B1 | 12/2010 | Mu | |
| 8,438,339 B2 | 5/2013 | Krishna et al. | |
| 9,021,048 B2 | 4/2015 | Luna et al. | |
| 9,092,156 B1 | 7/2015 | Xu et al. | |
| 2002/0010836 A1* | 1/2002 | Barroso | G06F 12/0811 |
| | | | 711/122 |
| 2002/0038391 A1 | 3/2002 | Ido et al. | |
| 2003/0101320 A1 | 5/2003 | Chauvel et al. | |
| 2005/0091457 A1* | 4/2005 | Auld | G06F 12/0897 |
| | | | 711/128 |
| 2005/0097272 A1 | 5/2005 | Jiang et al. | |
| 2005/0172098 A1 | 8/2005 | Worley | |
| 2006/0218349 A1 | 9/2006 | Oe et al. | |
| 2007/0011420 A1* | 1/2007 | Boss | G06F 3/0605 |
| | | | 711/165 |
| 2008/0256294 A1* | 10/2008 | Gill | G06F 12/0897 |
| | | | 711/117 |
| 2010/0325352 A1* | 12/2010 | Schuette | G06F 3/0613 |
| | | | 711/103 |
| 2011/0099335 A1 | 4/2011 | Scott et al. | |
| 2011/0161589 A1* | 6/2011 | Guthrie | G06F 12/12 |
| | | | 711/122 |
| 2012/0297113 A1* | 11/2012 | Belluomini | G06F 12/0866 |
| | | | 711/103 |
| 2012/0317312 A1 | 12/2012 | Elko et al. | |
| 2013/0254462 A1 | 9/2013 | Whyte | |
| 2014/0013053 A1 | 1/2014 | Sawin et al. | |
| 2014/0019650 A1 | 1/2014 | Li et al. | |
| 2014/0082288 A1 | 3/2014 | Beard et al. | |
| 2014/0101370 A1* | 4/2014 | Chu | G06F 12/06 |
| | | | 711/103 |
| 2014/0115256 A1 | 4/2014 | Liu et al. | |
| 2014/0129779 A1 | 5/2014 | Frachtenberg et al. | |
| 2014/0156935 A1* | 6/2014 | Raikin | G06F 12/0888 |
| | | | 711/128 |
| 2014/0223072 A1 | 8/2014 | Shivashankaraiah et al. | |
| 2015/0026403 A1 | 1/2015 | Ish et al. | |
| 2015/0178097 A1 | 6/2015 | Russinovich | |
| 2015/0301931 A1* | 10/2015 | Ahmad | G06F 12/023 |
| | | | 711/170 |
| 2015/0324294 A1 | 11/2015 | Ogawa et al. | |
| 2015/0378953 A1 | 12/2015 | Debbage et al. | |

OTHER PUBLICATIONS

EMC Corporation, "EMC VSPEX with EMC XtremSF and EMC XtremSW Cache;" Design Guide; May 2013; 84 Pages.

"Pointer Basics;" Retrieved on Dec. 17, 2015 from Stanford CS Education Library; https://web.archive.org/web/20120214194251/http://cslibrary.stanford.edu/106; 5 Pages.

"Logical Unit Number (LUN);" Definition from Techopedia.com; Retrieved on Dec. 17, 2015; https://web.archive.org/web/20120113025245/http://www.techopedia.com/definition/321/logical-unit-number-lun; 2 Pages.

Office Action dated Feb. 23, 2016; for U.S. Appl. No. 14/501,112; 24 pages.

Response dated Jan. 21, 2016 Office Action for U.S. Appl. No. 14/318,939 as filed on Apr. 14, 2016; 7 pages.

Tam et al., "mlcache: A Flexible Multi-Lateral Cache Simulator;" Proceedings of the 6$^{th}$ International Symposium on Modeling, Analysis and Simulation of Computer and Telecommunication Systems; Jul. 19-24, 1998; pp. 19-26; 8 Pages.

Response to U.S. Office Action dated Dec. 11, 2015 corresponding to U.S. Appl. No. 14/319,440; Response filed on Feb. 26, 2016; 33 Pages.

U.S. Final Office Action dated Jun. 3, 2016 corresponding to U.S. Appl. No. 14/319,440; 46 Pages.

Response to U.S. Office Action dated Feb. 23, 2016 corresponding to U.S. Appl. No. 14/501,112; Response filed on Jun. 2, 2016; 10 Pages.

Cooney et al., "Prioritization for Cache Systems;" U.S. Appl. No. 14/319,440, filed Jun. 30, 2014; 23 Pages.

Michaud et al., "Methods and Apparatus for Memory Tier Page Cache with Zero File;" U.S. Appl. No. 14/501,112, filed Sep. 30, 2014; 28 Pages.

Michaud, "Methods and Apparatus for Direct Cache-Line Access to Attached Storage with Cache;" U.S. Appl. No. 14/318,939, filed Jun. 30, 2014; 16 Pages.

EMC Corporation, "Introduction to EMC Xtremcache;" White Paper; Nov. 2013; 33 Pages.

EMC Corporation, "EMC VSPEX with EMC XTREMSF and EMC Xtremcache;" Design Guide; Dec. 2013; 95 Pages.

U.S. Appl. No. 14/318,939 Office Action dated Jan. 21, 2016, 9 pages.

U.S. Appl. No. 14/501,112 Final Office Action dated Jul. 29, 2016, 33 pages.

Response to Final Office Action dated Jun. 3, 2016 corresponding to U.S. Appl. No. 14/319,440; Response filed Sep. 22, 2016; 18 Pages.

Advisory Action dated Sep. 30, 2016 corresponding to U.S. Appl. No. 14/319,440; 3 Pages.

Response to Final Office Action dated Jul. 29, 2016 corresponding to U.S. Appl. No. 14/501,112; Response filed on Oct. 31, 2016; 17 Pages.

Response to Final Office Action dated Jul. 14, 2016 corresponding to U.S. Appl. No. 14/318,939; Response filed on Oct. 5, 2016; 7 Pages.

Advisory Action dated Oct. 13, 2016 corresponding to U.S. Appl. No. 14/318,939; 3 Pages.

Supplemental Response to Final Office Action dated Jul. 14, 2016 corresponding to U.S. Appl. No. 14/318,939; Response filed on Oct. 14, 2016; 7 Pages.

U.S. Notice of Allowance dated Nov. 10, 2016 for U.S. Appl. No. 14/319,440; 21 Pages.

Advisory Action dated Nov. 8, 2016 for U.S. Appl. No. 14/318,939; 3 Pages.

Response to Final Office Action dated Jul. 14, 2016 for U.S. Appl. No. 14/318,939; Respone filed on Nov. 9, 2016; 8 Pages.

U.S. Appl. No. 14/318,939 Final Office Action dated Jul. 14, 2016, 11 pages.

Response to U.S. Non-Final Office Action dated Mar. 24, 2017 for U.S. Appl. No. 14/501,112; Response filed on Jun. 26, 2017; 17 Pages.

Notice of Allowance dated Mar. 23, 2017 for U.S. Appl. No. 14/318,939; 11 Pages.

U.S. Non-Final Office Action dated Mar. 24, 2017 for U.S. Appl. No. 14/501,112; 35 Pages.

Appeal Brief filed Jan. 16, 2018 corresponding to U.S. Appl. No. 14/501,112; 19 Pages.

U.S. Final Office Action dated Aug. 2, 2017 for U.S. Appl. No. 14/501,112; 30 Pages.

(56) References Cited

OTHER PUBLICATIONS

U.S. Notice of Allowance dated May 2, 2018 for U.S. Appl. No. 14/501,112; 9 Pages.

* cited by examiner

SYSTEM AND METHOD UTILIZING A CACHE FREE LIST AND FIRST AND SECOND PAGE CACHES MANAGED AS A SINGLE CACHE IN AN EXCLUSIVE MANNER

BACKGROUND

A data storage system environment typically includes one or more host computing devices ("hosts") in communication with one or more storage arrays. A host typically executes an application program (e.g., a database application) which requires data associated with the application to be stored locally (i.e., on the host), remotely (i.e., on one of the storage arrays), or stored both locally and remotely. The host typically includes memory devices that provide both volatile random-access memory capacity (e.g., dynamic random-access memory (DRAM)) and non-volatile random-access memory capacity (e.g., flash memory devices). The storage array typically includes storage devices that provide non-volatile random-access storage capacity (e.g., flash memory devices) and non-volatile large storage capacity (e.g., hard disk drives (HDDs) and tape drives). In general, random-access memory is used to satisfy high throughput and/or bandwidth requirements of a given application program while the hard disk and tape drives are used to satisfy capacity requirements.

In a data storage environment, the ability to define multiple, independent memory tiers is desirable. A memory tier is typically constructed by memory mapping a region of a storage class memory (SCM) device or a region of an array storage device into a process's virtual address space. A memory-mapped region may be fronted by a DRAM page cache to which an application issues loads and stores. The memory tiering mechanism moves data between the SCM or array device and the DRAM page cache on an on-demand basis. In addition, a processor may utilize a memory cache (also referred to as a "CPU cache") to reduce the average time to access data from a main memory. It is known to provide multiple independent CPU caches, including instruction and data caches, where the data cache is typically organized as a hierarchy of more cache levels (L1, L2 etc.). It is desirable to continually improve the performance of computer systems that utilize significant amounts of memory.

SUMMARY

According to one aspect of the disclosure, a method comprises: receiving a request to read first data; determining if the first data is located within a first cache; determining if the first data is located within a second cache, wherein the first cache has faster access than the second cache; if the first data is not located within either the first cache or the second cache, promoting the first data from a backing store to the second cache; if the first data is located within the first cache, migrating the first data to the second cache based upon access heuristics; if the first data is located within the second cache, migrating the first data to the first cache based upon the access heuristics; and returning the first data.

In some embodiments of the method, returning the first data comprises returning the first data from the first cache or second cache. In certain embodiments, the first cache and the second cache comprise memory caches, the first data comprises cache line data, and the backing store comprises main memory. In particular embodiments, the backing store comprises array storage. In some embodiments, the first cache and the second cache are located upon a peripheral device coupled to a central processing unit (CPU) via a Peripheral Component Interconnect Express (PCIe) bus. In some embodiments, promoting the data from the backing store to the second cache comprises: determining if evicted data is dirty; and writing the evicted data to the backing store if the evicted data is dirty.

In certain embodiments of the method, the first cache and the second cache comprise page caches and the first data comprises a page of data. The method may further comprise: determining if the page is located within a first cache free list associated with the first cache; determining if the page is located within a second cache free list associated with the second cache; if the page is located within the first cache free list, mapping the page back into the first cache; and if the page is located within the second cache free list, mapping the page back into the second cache.

According to another aspect of the disclosure, a system comprises: a first cache; a second cache having slower access than the first cache; a cache module operatively coupled to the first cache and the second cache. The cache module may be configured to: receive a request to read first data; determine if the first data is located within the first cache; determine if the first data is located within the second cache; if the first data is not located within either the first cache or the second cache, promote the first data from a backing store to the second cache; if the first data is located within the first cache, migrate the first data to the second cache based upon access heuristics; if the first data is located within the second cache, migrate the first data to the first cache based upon the access heuristics; and return the first data.

In some embodiments of the system, the cache module is configured to return the first data from the first cache or the second cache. In particular embodiments, the first cache and the second cache comprise memory caches, the first data comprises cache line data, and the backing store comprises main memory. In certain embodiments, the backing store comprises array storage. In some embodiments, the first cache and the second cache are located upon a peripheral device coupled to a CPU via a PCIe bus.

In certain embodiments of the system, the first cache and the second cache comprise page caches and the first data comprises a page of data. The cache module may be further configured to: determine if the page is located within a first cache free list associated with the first cache; determine if the page is located within a second cache free list associated with the second cache; map the page back into the first cache if the page is located within the first cache free list; and map the page back into the second cache if the page is located within the second cache free list.

In certain embodiments of the method and system, the first cache comprises dynamic random-access memory (DRAM) and the second cache comprises next generation non-volatile memory (NGNVM). The second cache may comprise NAND Flash memory.

BRIEF DESCRIPTION OF THE DRAWINGS

The concepts, structures, and techniques sought to be protected herein may be more fully understood from the following detailed description of the drawings, in which.

Figure 1:
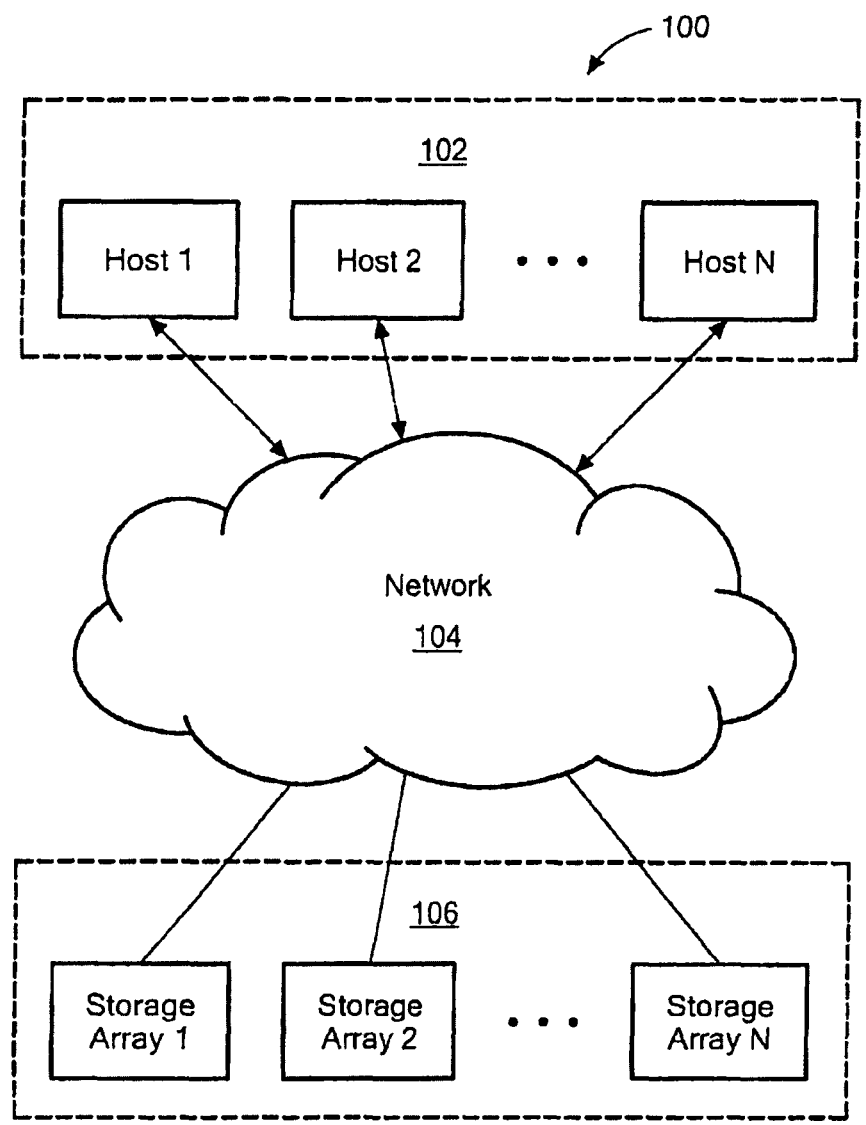
FIG. 1 is a network diagram illustrating a data memory and storage system environment.

The drawings are not necessarily to scale, or inclusive of all elements of a system, emphasis instead generally being placed upon illustrating the concepts, structures, and techniques sought to be protected herein.

DETAILED DESCRIPTION

Embodiments of the present invention will be described herein with reference to illustrative computing systems, data memory and storage systems, and associated servers, computers, memory devices, storage devices and other processing devices. It is to be appreciated, however, that embodiments of the invention are not restricted to use with the particular illustrative system and device configurations shown.

Before describing embodiments of the concepts, structures, and techniques sought to be protected herein, some terms are explained. The phrases "computer," "computing system," "computing environment," "processing platform," "data memory and storage system," and "data memory and storage system environment" as used herein with respect to various embodiments are intended to be broadly construed, so as to encompass, for example, private or public cloud computing or storage systems, or parts thereof, as well as other types of systems comprising distributed virtual infrastructure and those not comprising virtual infrastructure.

The terms "application," "program," "application program," and "computer application program" herein refer to any type of software application, including desktop applications, server applications, database applications, and mobile applications. The terms "application process" and "process" refer to an instance of an application that is being executed within a computing environment. As used herein, the term "object" refers to a logical grouping of data within an application, including primitive data types (e.g. integers and characters), arrays, trees, structures, unions, hashes, etc. The term "object reference" herein refers to any type of reference to an object, such as a pointer.

The term "source code" refers to computer instructions in a high-level programming language such as C®, C++®, Java®, Ruby®, Python®, etc. The term "machine code" refers to: (1) a set of instructions executed directly by a computer's processor or a virtual machine processor; and (2) such instructions expressed in the assembly language. The term "compiler directive" is used herein to refer to reserved syntax which controls the operation of a compiler and which is separate from normal computer instructions. Non-limiting examples of compiler directives include pre-processor directives and storage classes.

The term "memory" herein refers to any type of computer memory accessed by an application using memory access programming semantics, including, by way of example, dynamic random-access memory (DRAM) and memory-mapped files. Typically, reads or writes to underlying devices are performed by an operating system (OS), not the application. As used herein, the term "storage" refers to any resource that is accessed by the application via input/output (I/O) device semantics, such as read and write system calls. In certain instances, the same physical hardware device is accessed by the application as either memory or as storage.

As used herein, the term "tiering" refers to the placement of information on an infrastructure resource commensurate with implementation of a defined policy. Such policies can take into account a variety of factors including, but not limited to: information utilization usage statistics (e.g., I/O reads, writes, memory access); customer information values associated with levels of service (e.g., gold, silver, bronze, production, test, sandbox, archive); and any other custom tiering stratification criteria.

FIG. 1 shows an illustrative data memory and storage system environment 100 comprising a plurality of application host computing devices ("application hosts") 102 operatively coupled to one or more storage arrays 106 via a network 104. The network 104 may be any known communication network or combination of networks including networks using protocols such as, but not limited to, Ethernet, Internet Small Computer System Interface (iSCSI), Fibre Channel (FC), wireless protocols, Remote Direct Memory Access (RDMA), Non-Volatile Memory Express™ (NVMe), etc.

The application hosts 102 are configured to execute applications, such as database applications. An application host 102 is typically a server (e.g., a Windows™ server, a Sun Solaris™ server, an HP™ server, a Linux™ server, etc.) upon which the application executes. A storage array 106, which may be a storage area network (SAN) array, comprises one or more storage products such as, by way of example, VNX™ and Symmetrix VMAX™, both commercially available from EMC Corporation of Hopkinton, Mass. A variety of other storage products may be utilized to implement at least a portion of a storage array.

In general operation, an application host executes the application using local memory resources and issues read and write requests ("commands") to a storage array 106. The storage array 106 is configured with storage resources used to store backend data files. The storage array 106 processes read and write commands received from the application host and, in the case of a read request, sends data stored thereon back to the requesting host.

In one aspect, the illustrative environment 100 provides a memory and storage tier architecture (or "structure"). The tier structure comprises one or more tiers resident on an application host 102 and one or more tiers resident on a storage array 106. As discussed further below, applications residing on the application hosts 102 determine (either automatically or in response to user input) on which of the various tiers to store data associated with the execution of an application.

Figure 2:
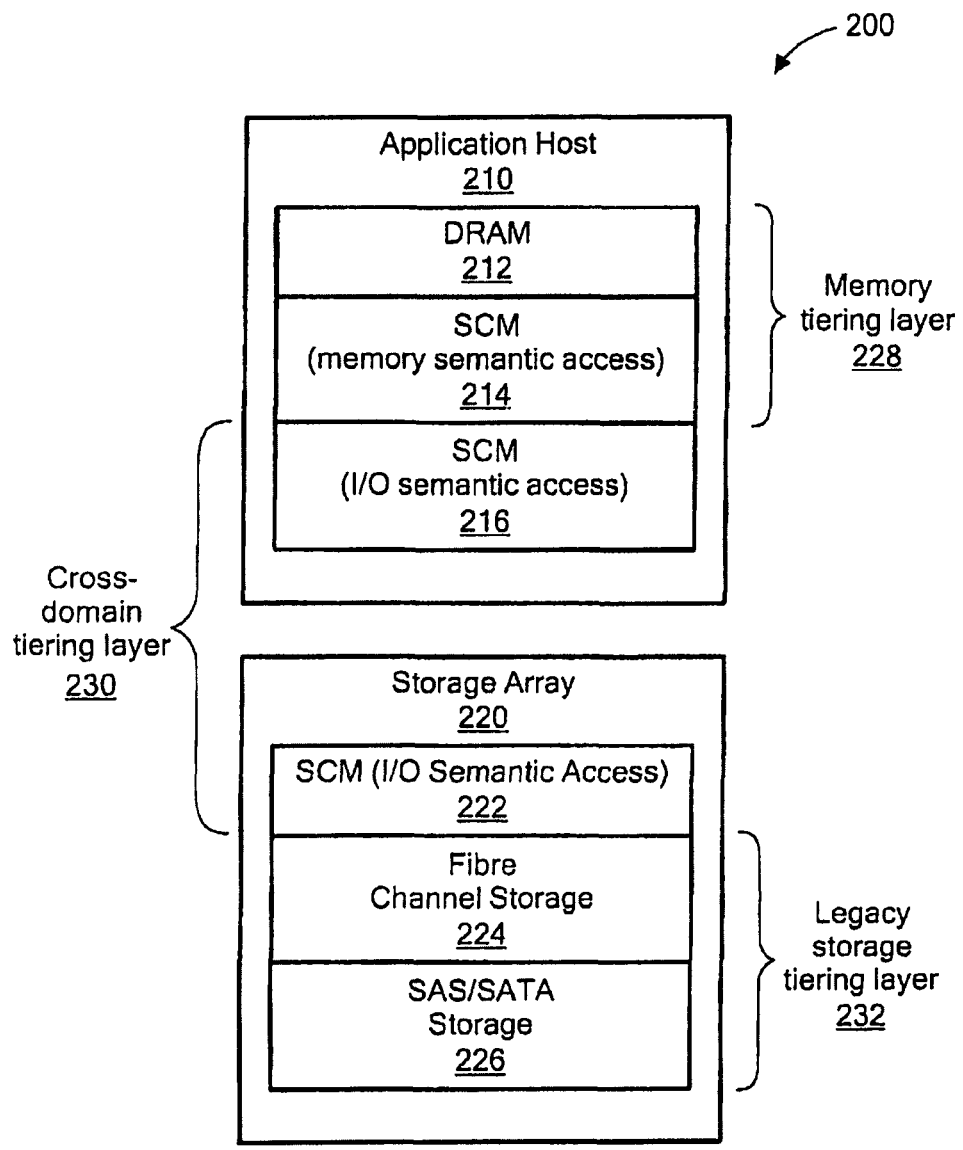
FIG. 2 is a block diagram illustrating a memory and storage tiering structure.

FIG. 2 shows an illustrative memory and storage tier structure 200. The illustrative tier structure 200 spans an application host 210 and a storage array 220, which may be the same as or similar to an application host 102 and a storage array 106 of FIG. 1, respectively. As shown, tiers resident on the application host 210 include a dynamic random-access memory tier 212 (e.g., DRAM or other form of volatile random-access memory), a storage-class memory (SCM) tier 214 accessible as a memory resource, and an SCM tier 216 accessible as an I/O resource. As further shown, tiers resident on the storage array 220 include an SCM tier 222 accessible as an I/O resource, a network (e.g., Fibre Channel) storage tier 224, and serial attached storage/serial advanced technology attachment (SAS/SATA) tier 226.

The SCM 214 tier comprises one or more SCM devices. Non-limiting examples of SCM devices include NAND flash and next generation non-volatile memory (NGNVM) devices. The SCM devices may be coupled to a Peripheral Component interconnect Express (PCIe) bus.

In one aspect, the tier structure 200 provides a memory tiering layer 228 (via memory tiers 212 and 214), a cross-domain tiering layer 230 (via SCM I/O accessible tiers 216 and 222), and a legacy storage tiering layer 232 (via storage tiers 224 and 226). Thus, an application can make data placement selections end-to-end (i.e., across the memory tiering layer, the cross-domain tiering layer, and the legacy storage tiering layer) or within a single within a tiering layer.

Figure 3A:
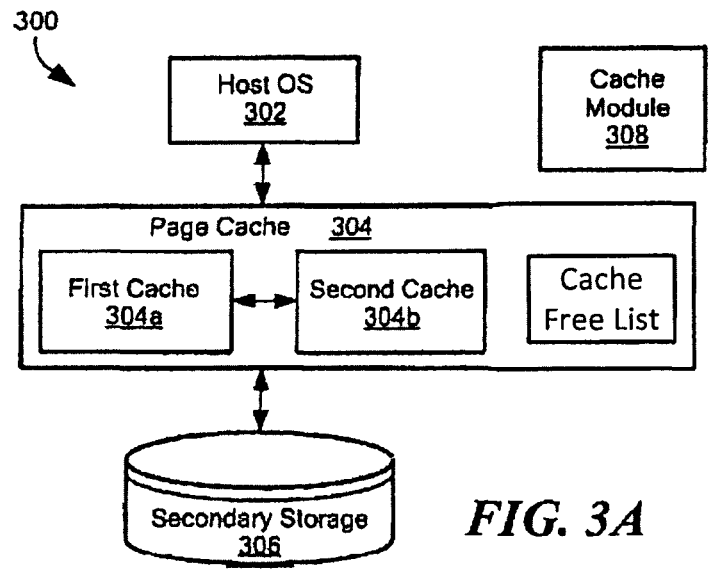
FIG. 3A is a block diagram of an illustrative system having a page cache.

Referring to FIG. 3A, an illustrative system 300 comprises a host OS 302, a page cache 304, secondary storage 306, and a cache module 308. The secondary storage 306 may correspond to a SCM device, such as the SCM 214 or 216 of FIG. 2, or a region of an array storage device, such as a portion of the storage array 106 of FIG. 1. In some embodiments, the host OS 302 accesses the page cache 304 via a local bus. In certain embodiments, secondary storage 306 is accessed over a network.

A page cache (also referred to as a disk cache) is a cache of disk-based pages kept in main memory (e.g., DRAM) by the OS for faster access. The faster access may result from a relatively faster memory technology and/or from avoiding relatively slow data transfer over a network or legacy bus. A page cache is typically implemented within a kernel via paging memory management facilities and, thus, is generally transparent to applications. Data is transferred between main memory and disk in blocks of fixed size, called "pages." As will be appreciated, the more requested pages residing in cache, the better the overall performance.

PCIe is a high-speed serial computer expansion bus standard based on point-to-point topology, with separate serial links connecting every device to the root complex (host). A PCIe link supports full-duplex communication between any two endpoints, with no inherent limitation on concurrent access across multiple endpoints. PCIe communication is encapsulated in packets handled by the transaction layer of the PCIe port. A PCIe link between devices can comprise 1 to 32 lanes. PCIe devices communicate via a logical connection called an interconnect (or link), which is a point-to-point communication channel between two PCk ports, allowing both to send/receive ordinary PCI-requests, such as configuration read/write, I/O read/write, memory read/write and interrupts. At the physical level, a link is composed of one or more lanes. Low-speed peripherals may use a single-lane while high speed peripherals, such as a graphics; card, may use a 16-lane link. A lane is composed of two differential signaling pairs: one pair for receiving data, the other for transmitting. Thus, each lane is composed of four wires or signal traces, where each lane is used as a full-duplex byte stream, transporting data packets in eight-bit 'byte' format, between endpoints of a link, in both directions simultaneously. Physical PCIe slots may contain from one to thirty-two lanes, in powers of two.

Referring again to FIG. 3A, a memory tiering mechanism within the host OS 302 moves data between the secondary storage 306 and the page cache 304 on an on-demand basis. In some embodiments, a memory tier is constructed by memory mapping a region of secondary storage 306 into a process's virtual address space. The memory-mapped region is fronted by a page cache 304 to which an application (not shown) issues loads and stores via the host OS 302.

The page cache 304 may be provided by memory devices connected directly to the memory interface of the processor. Alternatively, the page cache 304 may be provided as a peripheral device connected to a central processing unit (CPU) via a PCIe bus accessed using a suitable host controller interface, such as NVM Express (NVMe), or Non-Volatile Memory Host Controller Interface (NVMHCI) specification. The peripheral device can be connected via a memory channel directly coupled to the CPU. It is understood that other peripheral devices can be coupled using any suitable interface mechanism.

The page cache 304 includes a first cache 304a and a second cache 304b. The second cache 304b is sometimes referred to as a "peer cache" because, unlike existing systems that may utilize a hierarchy of cache tiers, the caches 304a and 304b are managed as a single cache in an exclusive fashion. This results in an aggregate page cache having a storage capacity generally equal to the sum of the cache 304a, 304b storage capacities. For example, a page can be accessed directly from the second cache 304b if not cached within the first cache 304a. In various embodiments, the first cache 304a utilizes a memory technology having faster access times compared to a memory technology utilized by the second cache 304b. In certain embodiments, the first cache 304a comprises DRAM and the second cache 304b comprises NGNVM.

The cache module 308 controls the operation of the page cache 304 and may include any suitable combination of hardware and/or software to that end. In some embodiments, the cache module 308 is provided as computer instructions executable by a processor. In certain embodiments, the cache module 308 is provided as a kernel driver (e.g., a Linux™ Kernel driver). Illustrative processing for use within the cache module 308 is shown ire FIGS. 4 and 5 and described below.

Figure 3B:
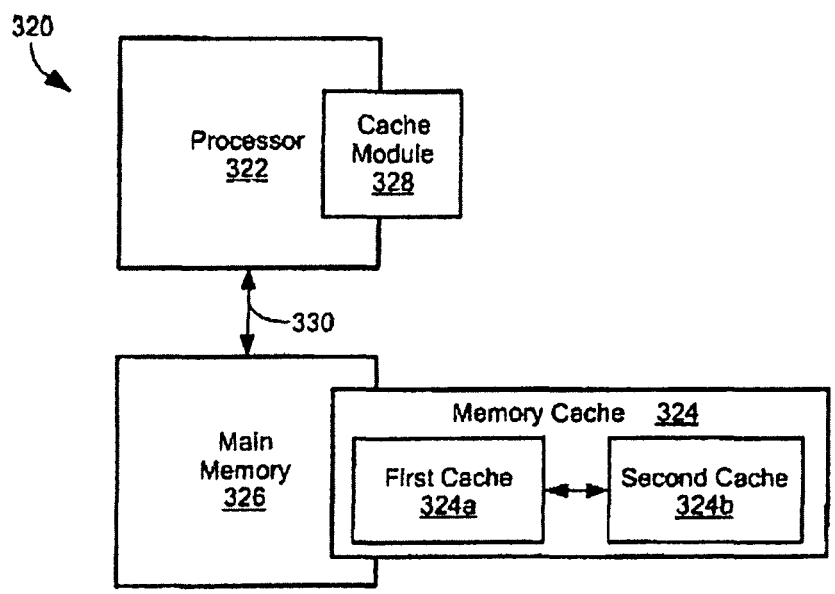
FIG. 3B is a block diagram of an illustrative system having a memory cache.

Referring to FIG. 3B, an illustrative system 320 includes a processor 322, a memory cache 324, a main memory 326, and a cache module 328. The processor is operatively coupled to the main memory via a memory channel 330, which may comprise a Dual Data Rate (DDR) memory channel or dual-channels. CPUs typically utilize one or more memory caches (also referred to as a "CPU caches") to reduce the average time to access data from a main memory. It is known to provide multiple independent CPU caches, including instruction and data caches, where the data cache is usually organized as a hierarchy of more cache levels (L1, L2 etc.). A CPU cache may reside within the CPU itself or within main memory. When the processor needs to read from or write to a location in main memory, it first checks whether a copy of that data is in the cache. If so, the processor immediately reads from or writes to the cache, which is much faster than reading from or writing to main memory. Data is transferred between memory and cache in blocks of fixed size, called "cache lines." When a cache line is copied from main memory into the cache, a cache entry is created. As will be appreciated, the more requested data resides in memory cache the better the overall performance.

Referring again to FIG. 3B, the processor 322 may correspond to a CPU within a host. A memory controller within the processor 322 moves data between the memory cache 324 and the processor 322 on an on-demand basis.

As shown, the memory cache 324 may reside within main memory 326. In other embodiments, the memory cache 324 is provided as a peripheral device (i.e., an attached storage device) connected to the processor 322 via a PCIe bus accessed using a suitable host controller interface, such as NVM Express (NVMe), or NVMHCI specification. In either case, the memory cache 324 is coupled directly to the processor's memory controller via memory channel 330 and, thus, can have direct cache-line access to a cache module 328.

The memory cache 324 includes a first cache 324a and a second cache 324b. The second cache 325b is sometimes referred to as a "peer cache" because, unlike existing systems that may utilize a hierarchy of cache tiers, the caches 324a and 324b are managed as a single cache in an exclusive fashion, resulting in an aggregate memory cache having a storage capacity generally equal to the sum of the cache 324a, 324b storage capacities. In various embodiments, the first cache 324a utilizes a memory technology having faster access times, i.e., access times that are less than a memory technology utilized by the second cache 324b. In certain embodiments, the first cache 324a utilizes DRAM and the second cache 324b utilizes NGNVM.

The cache module 328 controls the operation of the memory cache 324 and may include any suitable combination of hardware and/or software to that end. In some embodiments, the cache module 328 is provided as hardware state machines or a combination of hardware state machines and firmware within the processor 322. Illustrative processing for use within the cache module 328 is shown in FIGS. 4 and 5 and described below.

Figure 4:
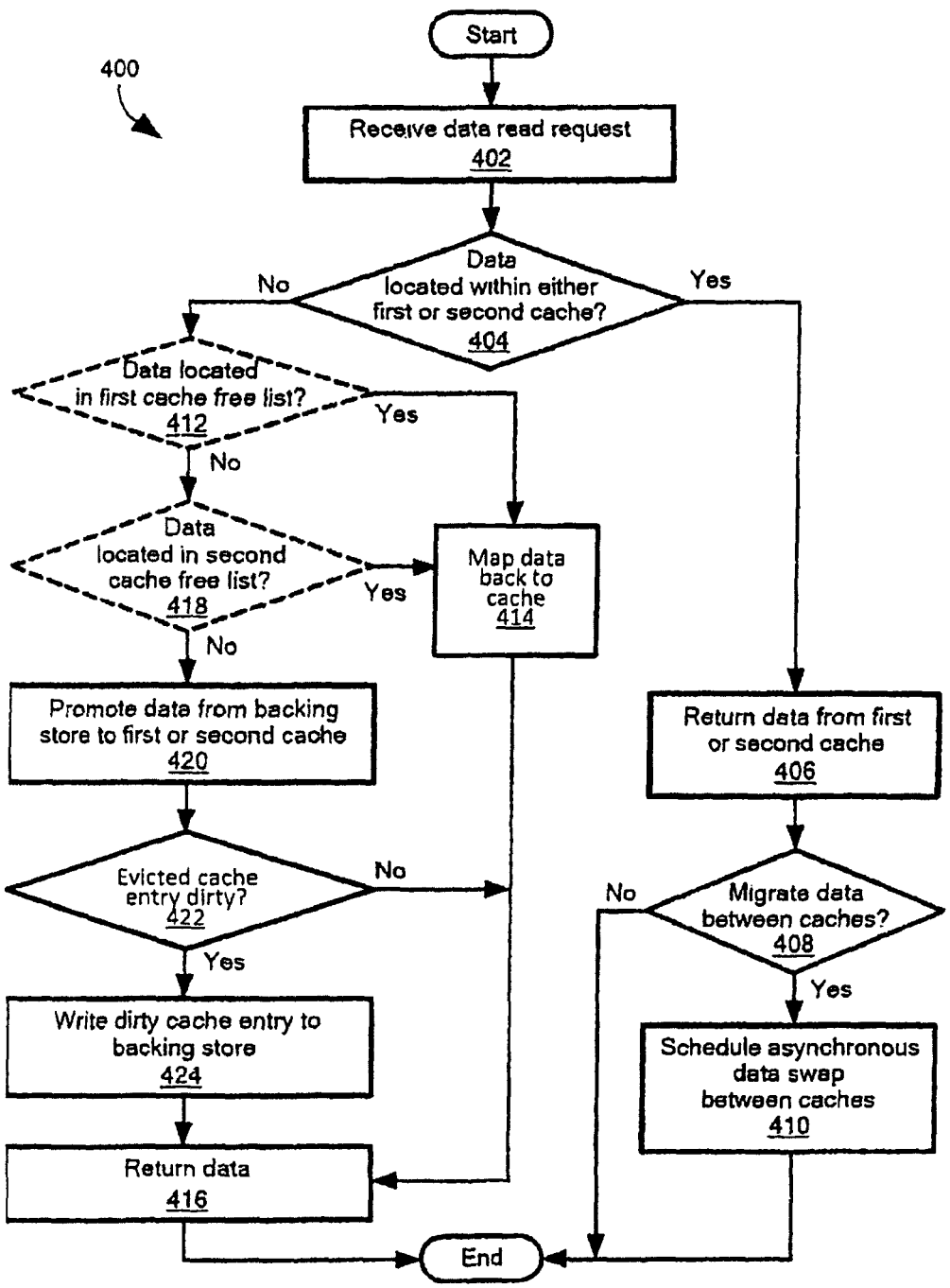
FIG. 4 is a flowchart illustrating a read process that can be used within the systems of FIGS. 1, 3A, and 3B.
Figure 5:
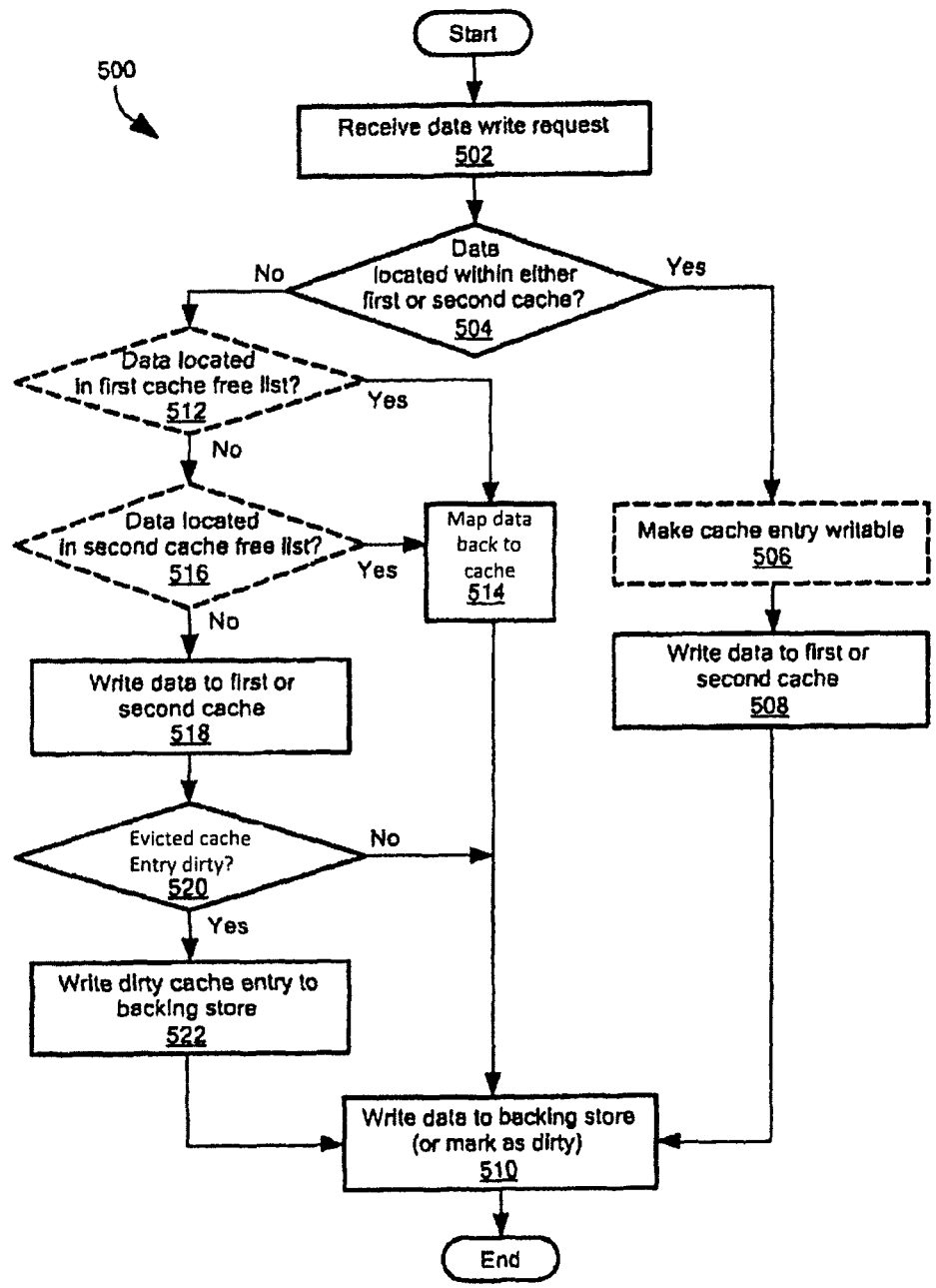
FIG. 5 is a flowchart illustrating a write process that can be used within the systems of FIGS. 1, 3A, and 3B.

FIGS. 4 and 5 are flowcharts showing illustrative processing that can be implemented within a data memory and storage system environment, such as the illustrative environment 100 of FIG. 1. More specifically, the shown processing can be implemented within a cache module, such as cache module 308 of FIG. 3A and/or cache module 328 of FIG. 3B. Rectangular elements (typified by element 402 in FIG. 4), herein denoted "processing blocks," represent computer software instructions or groups of instructions. Diamond shaped elements (typified by element 404 in FIG. 4), herein denoted "decision blocks," represent computer software instructions, or groups of instructions, which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

Referring to FIG. 4, an illustrative process 400 begins at block 402, where a data read request is received. This read request may correspond to a page fault (for a page cache) or a cache-line memory access (for a memory cache). The request identifies the location of data to be read which may correspond to a virtual memory address, a page number, a physical cache line address, etc.

At block 404, it is determined whether the requested data is located within either the first cache or second cache. If the data is located within a cache, at block 406, the data can be returned directly from that cache. In addition, at block 408, it is determined whether to migrate (or "swap") the data between the first and second caches. This decision can be based upon any suitable access heuristics or by hints provided by an application. As used herein, the term "access heuristics" refers to any decision making based upon historical access information for a given cache entry. For example, the cache may maintain statistics on how frequently individual cache entries are accessed; if the requested data is frequently accessed relative to other data in the cache, the data may be migrated from the second cache to the relatively faster first cache. As another example, the cache may maintain statistics on how recently individual cache entries have been accessed and use this information to determine if data should be migrated. As yet another example, the cache may use a heuristic to minimize wear on the second cache devices.

Application hints are directives from an application that describe the expected access characteristics and importance of the data. For example, if an application determines that data will be accessed frequently or requires low latency (either using its own heuristics, user input, etc.), it can provide a hint to the cache, which the cache can use to place the data in the relatively faster first cache. Whereas access heuristics are determined internal to the cache, application hints are determined external to the cache.

If, at block 408, it is determined to migrate the data between caches, an asynchronous task is scheduled to swap the data from the first cache to the second cache or vice versa, at block 410. In other embodiments, the data can be swapped synchronously.

If, at block 404, the data is not located within either the first or second cache, it may be promoted from backing store to cache so that the performance of subsequent read requests may be improved. As used herein, the term "backing store" refers to any storage facility separate from the caches, such as the secondary storage 306 of FIG. 3A and main memory 326 of FIG. 3B.

It will be understood that a page cache (e.g., page cache 304 of FIG. 3A) may utilize a cache free list to track pages which have been marked for removal from the cache, but which have not yet been removed. Data (i.e., pages) located within a cache free list can be efficiently mapped back to the cache without accessing the backing store. Accordingly, in some embodiments, if the requested data is located within the first cache free list (determined at block 412), the data is mapped back to the first cache (block 414). Likewise, if the data is located within the second cache free list (determined at block 418), the data is mapped back to the second cache (block 414). In other embodiments (e.g., in the context of a memory cache), processing blocks 412 and 418 are not performed.

If the data is not in either cache, it is promoted from the backing store to either the first cache or second cache at block 420. The determination of which cache to promote to may be based on access heuristics and/or application hints, which are discussed above. If the cache does not have prior access information for the data and no application hint has been given, the cache can use a default policy to determine the cache to promote at block 420. In some embodiments, the cache uses a default promotion-based scheme, whereby data is initially promoted to the slower second cache and, when the data is subsequently accessed, the cache considers migrating the data to the relatively faster first cache, as discussed above in conjunction with block 408. In other embodiments, the cache uses a default demotion-based scheme, whereby data is initially promoted to the faster first cache and subsequently considers moving the data to the relatively slower second cache.

Before the requested data can be moved from the backing store, existing data (i.e., one or more cache entries) may need to be evicted to make room within the cache. The evicted cache entry can be selected using any conventional technique, such as least-recently used (LRU) or first-in first-out (FIFO). If the cache uses a write-back policy whereby writes are not synchronously executed on the backing store (as discussed below in conjunction with FIG. 4), the evicted cache entry may be "dirty." If, at block 422, the evicted cache entry is dirty, the evicted data is written to the backing store at block 424. At block 416, the data is returned. In some embodiments, the data is returned from the corresponding cache to which it was promoted.

Referring to FIG. 5, an illustrative process 500 begins at block 502, where a data write request is received. At block 504, it is determined whether the data is located within either the first or second caches. If the data is located within either cache, the data is written to the corresponding cache at block 508.

Existing memory caches allow for cache entries to be in different states. For example, INTEL processor caches support exclusive and modified states. When in either of these states, the CPU can write data to the cache. However, if the CPU is in a different state, the CPU may not be able to write data to the cache. Accordingly, in some embodiments, the existing cache entry is first changed to a writable state at block 506.

If the data is not located within either the first or second cache, it may be promoted to cache using the same or similar techniques described above in conjunction with FIG. 4. Specifically, for page caches, the data may be mapped back if it exists within either the first cache free list or second cache free list (blocks 512-516). Otherwise, the data is added or written to the first or second cache (block 518) based upon access heuristics, application hints, and/or the default promotion/demotion policy; and an existing cache entry may be evicted (blocks 520-522).

A cache utilizes a write policy that determines when data is written to the backing store. Using a "write-through" policy, data is synchronously written to the cache and the backing store. Using a "write-back" policy, data is initially written only to cache and the write to the backing store is postponed until the cache entries containing the data are written back by some asynchronous process or are about to be modified/replace by new data. Such cache entries are marked as "dirty" until such time as they are written to the backing store. Accordingly, at block 510, if the cache utilizes a write-through policy, the data is written to the backing store. Otherwise, at block 510, the cache entry is marked as dirty and not written to the backing store.

It will be appreciated that FIGS. 4 and 5 illustrate processing that can be used within the page cache 304 of FIG. 3A, the memory cache 324 of FIG. 3B, and any other suitable types of caches.

Figure 6:
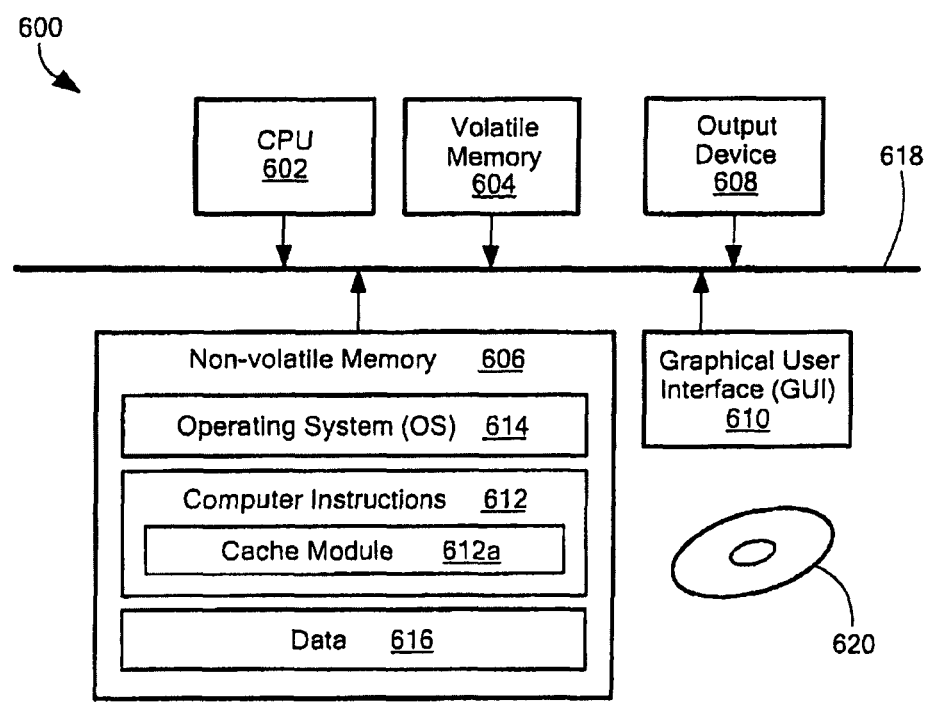
FIG. 6 is a schematic representation of a computer that can perform at least a portion of the processing described herein.

FIG. 6 shows an illustrative computer or other processing device 600 that can perform at least part of the processing described herein. The computer 600 includes a processor or CPU 602, a volatile memory 604, a non-volatile memory 606 (e.g., hard disk), an output device 608 and a graphical user interface (GUI) 610 (e.g., a mouse, a keyboard, a display, for example), each of which is coupled together by a bus 618. The non-volatile memory 606 stores computer instructions 612, an operating system (OS) 614, and data 616. The computer instructions 612 can be executed by the processor or CPU 602 out of volatile memory 604. As shown, the computer instructions 612 may comprise a cache module 612a which may be the same as or similar to cache module 308 of FIG. 3A and/or to cache module 328 of FIG. 3B. In one embodiment, an article 620 comprises a non-transitory computer-readable storage medium storing instructions.

Processing may be implemented in hardware, software, or a combination of the two. In embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, a data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM (compact disc-read Only memory), hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that that scope of protection sought herein should not be limited to the described embodiments but rather should be limited only by the spirit and scope of the following claims.

What is claimed is:

1. A method comprising:
receiving a request to read a first page from an application;
determining if the first page is located within a first page cache;
determining if the first page is located within a second page cache, wherein the first page cache has a faster access time than the second page cache;
if the first page is not located within either the first page cache or the second page cache, determining if the first page is located within a cache free list associated with the first or second page cache;
if the first page is located within the cache free list, mapping the first page back into the associated page cache;
if the first page is not located within the cache free list, promoting the first page from a backing store to either the first page cache or the second page cache according to at least one of access heuristics and an application hint, wherein the access heuristics comprises first access heuristics used to minimize wear on the second page cache which comprises non-volatile memory (NVM) and second access heuristics used to control operation of the first page cache and the second page cache, and wherein the application hint is provided by the application to describe access characteristics of the first page;
if the first page is located within the first page cache, migrating the first page from the first page cache to the second page cache based upon the first access heuristics;
if the first page is located within the second page cache, migrating the first page from the second page cache to the first page cache based upon the second access heuristics,
wherein the first page cache and the second page cache are managed as a single cache in an exclusive fashion,
wherein the second heuristics are different than the first heuristics, and wherein the first access heuristics and the second access heuristics are based on historical access information for a given cache entry; and
returning the first page.

2. The method of claim 1 wherein returning the first page comprises returning the first page from the first page cache or the second page cache.

3. The method of claim 1 wherein the backing store comprises array storage.

4. The method of claim 1 wherein promoting the first page from the backing store to the second page cache comprises:
determining if evicted data is dirty; and
writing the evicted data to the backing store if the evicted data is dirty.

5. The method of claim 1 wherein the first page cache comprises dynamic random-access memory (DRAM).

6. The method of claim 1 wherein the second page cache comprises NAND Flash memory.

7. A system comprising:
a first page cache;
a second page cache having a slower access time than the first page cache, wherein the first page cache and the second page cache are managed as a single cache in an exclusive fashion; and
a cache module operatively coupled to the first page cache and the second page cache, the cache module configured to:
receive a request to read a first page from an application;
determine if the first page is located within the first page cache;
determine if the first page is located within the second page cache;
if the first page is not located within either the first page cache or the second page cache, determine if the first page is located within a cache free list associated with the first or second page cache;
if the first page is located within the cache free list, map the first page back into the associated page cache;
if the first page is not located within the cache free list, promoting the first page from a backing store to either the first page cache or the second page cache according to at least one of access heuristics and application hint, wherein the access heuristics comprises first access heuristics used to minimize wear on the second page cache which comprises non-volatile memory (NVM) and second access heuristics used to control operation of the first page cache and the second page cache, and wherein the application hint is provided by the application to describe access characteristics of the first page;
if the first page is located within the first page cache, migrate the first page from the first page cache to the second page cache based upon the first access heuristics;
if the first page is located within the second page cache, migrate the first page from the second page cache to the first page cache based upon the second access heuristics,
wherein the second heuristics are different than the first heuristics, and wherein the first access heuristics and the second access heuristics are based on historical access information for a given cache entry; and
return the first page.

8. The system of claim 7 wherein the cache module is configured to return the first page from the first page cache or the second page cache.

9. The system of claim 7 wherein the backing store comprises array storage.

10. The system of claim 7 wherein the first page cache comprises dynamic random-access memory (DRAM).

11. The system of claim 7 wherein the second page cache comprises NAND Flash memory.

* * * * *